United States Patent
Larsson

(10) Patent No.: US 10,554,670 B2
(45) Date of Patent: Feb. 4, 2020

(54) METHOD AND SECURE ELEMENT FOR USING A NETWORK

(71) Applicant: GIESECKE & DEVRIENT GMBH, München (DE)

(72) Inventor: Thomas Larsson, Älvsjö (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 128 days.

(21) Appl. No.: 15/324,328

(22) PCT Filed: Jun. 15, 2015

(86) PCT No.: PCT/EP2015/001201
§ 371 (c)(1),
(2) Date: Jan. 6, 2017

(87) PCT Pub. No.: WO2016/005022
PCT Pub. Date: Jan. 14, 2016

(65) Prior Publication Data
US 2017/0163657 A1    Jun. 8, 2017

(30) Foreign Application Priority Data
Jul. 8, 2014  (EP) .................................. 14002347

(51) Int. Cl.
*H04L 29/06* (2006.01)
*G06F 21/57* (2013.01)
(Continued)

(52) U.S. Cl.
CPC .......... *H04L 63/108* (2013.01); *G06F 21/575* (2013.01); *H04L 9/3234* (2013.01);
(Continued)

(58) Field of Classification Search
CPC ............ H04L 63/0853; H04L 63/0807; H04L 63/108; H04L 9/3234; G06F 21/575
See application file for complete search history.

(56) References Cited

U.S. PATENT DOCUMENTS 5,887,253 A * 3/1999 O'Neil ................. H04W 8/265
                                                          455/410
7,623,865 B2 * 11/2009 Julka ................. H04W 36/0055
                                                          370/328
(Continued)

FOREIGN PATENT DOCUMENTS

AT            507204 A4     3/2010

OTHER PUBLICATIONS

M. Roland, J. Langer and J. Scharinger, "Practical Attack Scenarios on Secure Element-Enabled Mobile Devices," 2012 4th International Workshop on Near Field Communication, Helsinki, 2012, pp. 19-24. (Year: 2012).*

(Continued)

*Primary Examiner* — Kari L Schmidt
(74) *Attorney, Agent, or Firm* — Workman Nydegger

(57) ABSTRACT

A method for using a network and a secure element, whereby the secure element of a device receives a request for usages data from the device. The secure element sends the usage data to the device in response to the request. The usage data enable the device to use the network. The secure element applies a timer to measure a delay time. The device shall only use the network, after the delay time has expired. The secure element prevents the usage of the network by the device until the delay time has expired.

10 Claims, 1 Drawing Sheet

(51) Int. Cl.
*H04L 9/32* (2006.01)
*H04W 12/00* (2009.01)

(52) U.S. Cl.
CPC ...... *H04L 63/0807* (2013.01); *H04L 63/0853* (2013.01); *H04W 12/00502* (2019.01)

(56) References Cited

U.S. PATENT DOCUMENTS

| | | | | |
|---|---|---|---|---|
| 8,295,811 B1* | 10/2012 | Gailloux | ............ | H04M 3/42144 455/411 |
| 9,106,272 B2* | 8/2015 | Marcovecchio | ........ | H04L 67/34 |
| 9,531,831 B1* | 12/2016 | Cuadrat | ................ | H04L 67/303 |
| 10,009,754 B2* | 6/2018 | Chan | ..................... | H04W 24/10 |
| 2002/0124182 A1* | 9/2002 | Bacso | ................... | G06Q 30/02 726/26 |
| 2007/0005769 A1 | 1/2007 | Ammerlaan et al. | | |
| 2008/0146280 A1* | 6/2008 | Sasse | .................... | H04W 8/183 455/558 |
| 2009/0058635 A1* | 3/2009 | LaLonde | ............ | A61N 1/37282 340/539.11 |
| 2009/0307364 A1 | 12/2009 | Shimakura | | |
| 2010/0146043 A1 | 6/2010 | Klopf | | |
| 2011/0096912 A1* | 4/2011 | Stahlin | ................. | G08B 25/002 379/39 |
| 2011/0250867 A1* | 10/2011 | Lee | ...................... | H04W 12/06 455/411 |
| 2012/0032789 A1* | 2/2012 | Ichimaru | ............ | G06Q 20/3226 340/10.5 |
| 2012/0108200 A1* | 5/2012 | Rubin | ..................... | H04L 47/14 455/405 |
| 2012/0208597 A1* | 8/2012 | Billman | ................ | H04W 8/205 455/558 |
| 2013/0029726 A1* | 1/2013 | Berionne | .............. | H04L 67/322 455/558 |
| 2013/0227137 A1* | 8/2013 | Damola | ................ | G06F 9/5072 709/224 |
| 2014/0057597 A1* | 2/2014 | Velusamy | ............. | H04W 12/08 455/411 |
| 2014/0088731 A1* | 3/2014 | Von Hauck | ........... | H04W 12/06 700/14 |
| 2014/0137101 A1* | 5/2014 | Chan | ....................... | H04L 67/34 717/176 |
| 2014/0171061 A1* | 6/2014 | Larmo | ................. | H04W 74/006 455/422.1 |
| 2014/0201253 A1* | 7/2014 | Chu | ........................ | G06F 7/588 708/250 |
| 2014/0243045 A1* | 8/2014 | Siquenique | .......... | H04B 1/3816 455/558 |
| 2015/0222635 A1* | 8/2015 | Yang | ..................... | H04B 1/3816 726/4 |
| 2015/0289137 A1* | 10/2015 | Yang | ..................... | H04W 12/06 455/411 |

OTHER PUBLICATIONS

J. C. Tan, P. A. Crossley, P. G. McLaren, P. F. Gale, I. Hall and J. Farrell, "Application of a wide area backup protection expert system to prevent cascading outages," in IEEE Transactions on Power Delivery, vol. 17, No. 2, pp. 375-380, Apr. 2002. (Year: 2002).*

Yang, Xiaowei, David Wetherall, and Thomas Anderson. "A DoS-limiting network architecture." ACM SIGCOMM Computer Communication Review. vol. 35. No. 4. ACM, 2005, pp. 241-252. (Year: 2005).*

Extended European Search Report for corresponding European Application No. 14002347.4, dated Dec. 19, 2014.

International Search Report for corresponding International PCT Application No. PCT/EP2015/001201, dated Oct. 19, 2015.

"Interruption-free power supply systems UPS catalog 2009," Master Guard, Series D 60-120 kVA, Mar. 19, 2009, URL:http://www.masterguard.at/portals/0/pdf-anhang/kataloge%20de/serie%20d%2060-200kva%20neu.pdf.

* cited by examiner

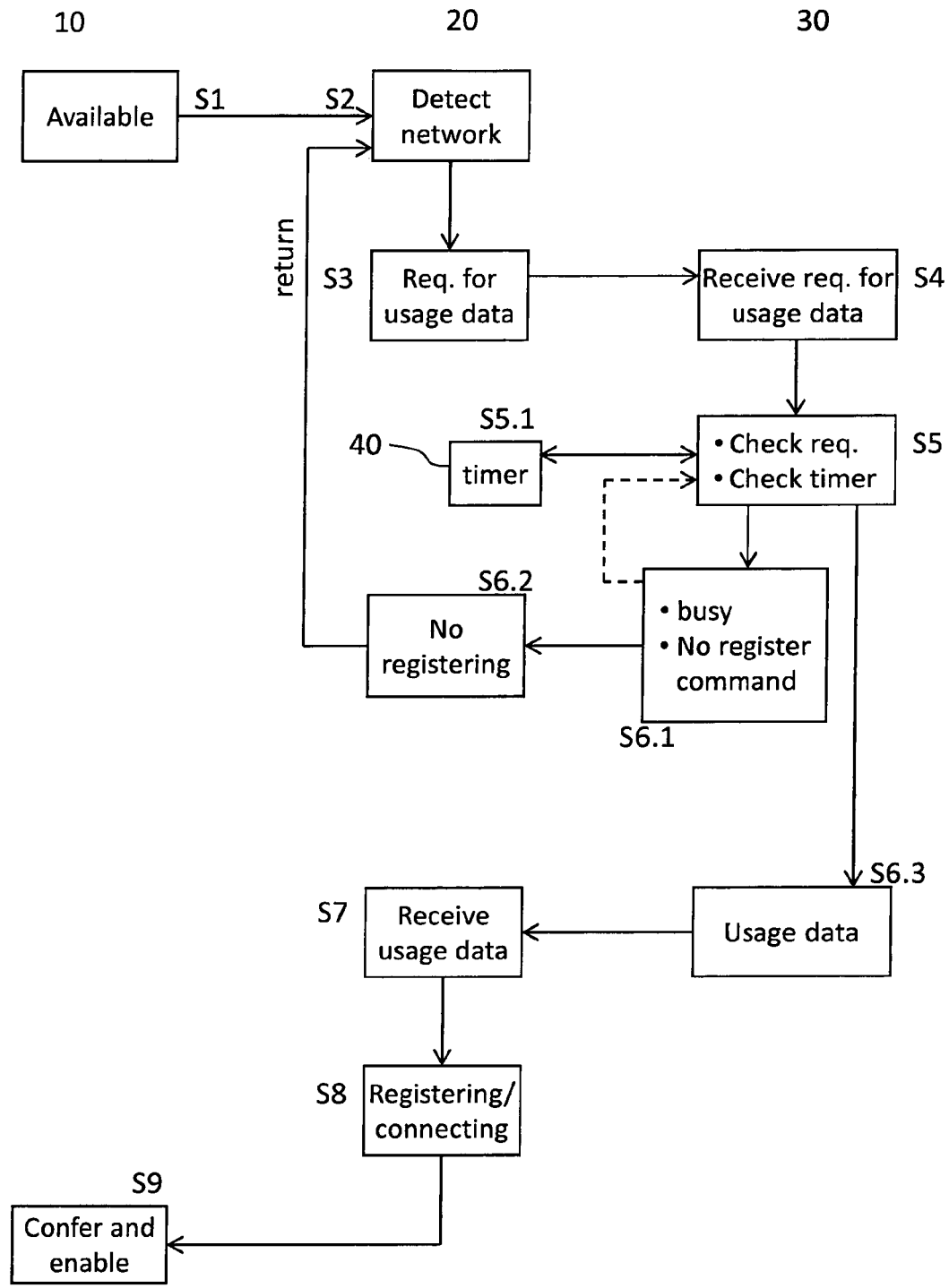

METHOD AND SECURE ELEMENT FOR USING A NETWORK

BACKGROUND

The present invention relates to a method and a secure element for using a network. In particular the present invention relates to a method using a network, wherein a secure element of a device receives a request for usage data from the device and the secure element sends the usage data to the device in response to the request, wherein the usage data enable the device to use the network.

To use a network a device has to connect to the network. Additionally, in some cases, e.g. in telecommunication purposes, the device has to register on the network. In particular, if there is a controlled network access and a controlled usage, the device, e.g. a telecommunication device, has to send registering data to the network for using the network. As soon as the network is available to the device it requests a secure element for usage data, e.g. usage data. The device applies the usage data from the secure element for using the network, in particular for registering to the network and/or to connect to the network. For example after a network-boot multiple devices attempt to use the network. Connecting to the network will result in a high traffic load causing a flooding and network overstress. The network will break down. Re-boot of the network will result in a break down again.

SUMMARY

The object of the present invention is to overcome the disadvantageous of the prior art. In particular the object of the present invention is to provide a method for reliable boot of network and using a network by a device without the risks of network overstress and network break down because of network overload.

The object is achieved by a method and a secure element according to the independent claims. Advantageous embodiments and developments are stated in the dependent claims.

In a method according to the invention for using a network a secure element of a device receives a request for usage data for the device. The secure element sends the usage data to the device in response to the request, wherein the usage data enable the device to use the network.

According to the invention the secure element applies a timer to measure a delay time, wherein the device shall use the network only after the delay time has expired. Otherwise, the secure element prevents the usage of the network by the device until the delay time has expired.

If a number of devices amongst usual devices perform the method according the invention for using the network in particular after reboot of the network, all devices don't perform a registering process at the same time. Preferably the delay time of the devices performing the method according the invention differs. After booting network, in particular rebooting, a balanced network-traffic is assured. Network-break-down is prevented.

The timer can be a time counter counting a certain time up or down for the delay time. When the delay time is expired the secure element performs further steps for using the network by the device. The delay time causes a time lag preferable between a first detection of the network availability to the device and a first attempt of the device to use the network, e.g. registering the device to the network and/or connecting the device to the network.

The secure element can be a portable data carrier, e.g. chip card, a mass storage card or a USB-token. The secure element can be permanently installed in a module or a device, the secure element for example being a trusted platform module (TPM), a M2M-module, a user identification module like an embedded SIM-(Subscriber Identification Module-) Card or a decoder module. The secure element can be integrated in a notebook, mobile telephone, computer or keyboard. Preferably the secure element comprises a CPU (in particular processor) and a memory. The CPU can be adapted to run an operating system.

The device can be an machine, an apparatus for building automation like an access control, a computer, a vehicle, in particular a car or a motorcycle, and/or a distribution system, in particular an electric power, gas and/or water distribution system. The device can be a multimedia apparatus, in particular a television, a radio and/or an audio system. Furthermore, the device can be a mobile device, in particular a mobile telephone or a handheld computer. The device can be an apparatus, machine or system on its own and/or a part thereof.

The network can be a power network, in particular an electricity network. Further, the network can be a water network, a communications network and/or gas network. In particular, if the network is an electricity network, a water network and/or gas network an additional communication line could be necessary between the device and a provider or supplier of the network for registering.

To use the network by the device in one embodiment the device has to send registering data to the network, to the supplier or to the provider. Moreover, probably the device has to connect to the network to access and finally use the network. The registering data and/or parameter and/or way for connecting to the network are included in usage data. To connect the device to the network for example a switch and/or a valve as to be actuated by the device the network, the provider and/or the supplier. In an embodiment, the network, the provider and/or the supplier has to accept the usage data, in particular registering data from the device to provide the network for usage by the device. The device could include a consumption meter to meter the usage of the network. The registering data can include personal data of the user of the device and/or of the secure element. In particular the process of registering the device and secure element, respectively, to the network, its provider and/or its supplier can be a process authenticate to the network, its provider and/or its supplier.

Preferable, the secure element detects the network availability by the device. The detection can be performed by a sensor of the device, e.g. electricity sensor, in particular voltage sensor. Furthermore secure element can use the request from the device for usage data to detect network availability. Further, the device and/or the secure element can receive a signal from the network, the provider of the network and/or the supplier of the network. The signal can include a request for the usage data, e.g. identification and/or registration information of the device and/or of the secure element.

In one embodiment according the invention the secure element starts a process executed on the device for using the network. The process ensures usage of the network, e.g. performing a registering process of the device to the network, its supplier and/or provider, and/or connecting the thereon. The process can supervise data exchange between the device and the secure element. Further, the process can perform a communication with and actuating a transmission and/or a switching element. The process can also run on the secure element.

In one embodiment, the secure element can block the device for using the network. Blocking can be an active event, e.g. sending an instruction/command to the device, wherein the instruction prevents the device to use the network, preferably to prevent the device to connect to the network. Further, the instruction can prevent the device for registering, in particular to send any usage data, e.g. registering data, to the network, its provider and/or its supplier.

To use the network the device can register to the network, its provider and/or its supplier. The usage data can include registering data, e.g. identification information of the device and/or secure element and/or personal data of a user of the device. Further, to use the network the device can perform a connecting step for connecting to the network.

In one embodiment, the secure element starts the timer when the secure element senses an attempt of the device to use the network. The secure element can monitor the device for potential communication to network, its provider and/or its supplier. The secure element also can monitor the device for actions in aspiration to connect to the network. For example the secure element can access and analyze an activity protocol of the device. If any activity corresponds to a scheme like to connect to the network the secure element starts the timer.

Further, the secure element can apply the timer when the network is available to the device and/or a power is available to the device. Preferably, the secure element and/or the device comprise a sensor for sensing physical data relating to the network, e.g. network quality, power, voltage and/or network identification. The sensor can be integrated in the device. The secure element can access to the sensor by monitoring or sending a request to the device. E.g. if an electrical power or a power network is measured by an electrical power sensor the device would start to connect to a load circuit of the power network. If a predetermined measured value is reached the secure element starts the timer at first.

Further secure element can log usage of the network by the device. The log can comprise different data, e.g. time, locality, network identification and/or connectivity. Further, the log can comprise data on attempts in using the network, in particular attempts in connecting to the network and/or attempts in registering to the network. After e.g. the number of attempts has reached a predetermined number the secure element starts the timer. In another embodiment the secure element analyses the log, e.g. network identification, locality and connectivity, to set and start the timer. E.g. the time delay of the timer can be set short, if the network has a presumable big capacity of network subscribers.

The delay time of the timer can be randomized. As stated above the time can be run on the secure element, on the device or on an external apparatus, e.g. a server. The timer can apply a random generator. Preferably the timer respects some determinants in particular network identification, identification of the secure element and/or the device, network connectivity and/or local information. There can be an algorithm to define the delay time. Otherwise the delay time can previously be defined as an individual value, e.g. during manufacturing the secure element or as a variable in the device. There can be a scheme respecting environmental and/or technical conditions, e.g. network identification, identification of the secure element and/or the device, network connectivity and/or local information.

In one embodiment the secure element provides invalid usage data, e.g. registering data, to the device until the delay time of the timer has expired. Using invalid usage data the device will not be accepted by the network, its provider and/or its supplier. Usage of the network, e.g. connecting and/or registering, is prevented. After the timer has expired the secure element provides correct usage data. The device can use the usage data to register on and/or connect to network, its supplier and/or provider.

In another embodiment secure element can advise the device for initiating a new process for using the network. The secure element can send a command to the device. The command has the effect that the device starts to connect to and/or registers on the network, in particular to login to the network.

Settings of the secure element, in particular the timer and a behavior until timer has expired as well as a behavior after timer has expired, in particular commands and answers to send, can be configured by an external operator. The external operator can be a trusted service manager (TSM). Usually, the TSM is a service provider for service management with respect to secure elements. The external operator can be the provider and/or the supplier of the network, too. Preferable, the external operator is a server. The external operator updates the secure element with corresponding settings and code. In particular, the external operator sets the delay time.

The external operator can be connected to the secure element via a contact based and/or a contactless interface. Preferably the operator is connected to the secure element via an over-the-air interface of the device, wherein the device is contact based connected to the secure element. Alternatively the secure element comprises an antenna to communicate with the operator over-the-air direct or indirect, e.g. via a server, a hub and/or a relay station. The communication between the operator and the device or the secure element, respectively, could be at least partial via Bluetooth, WLAN or mobile telephone network. The communication could be independent from network to use.

In one embodiment the secure element analyses a failure on a connection between the network and the device. The secure element monitors the device in view of its connection to the network, in particular data transfer rate, attempts to use the network and/or term of use the network. E.g. the secure element can count the number of attempts to use. As a result if a number of usage attempts within a certain time exceeds a predefined number, this is interpreted as an instable network. Hence, the secure element determines that there is no network available.

A secure element according to the invention is configured to perform the above mentioned method and/or steps.

An Embodiment of the secure element comprises a restriction module. The restriction module comprises at least an interface to the timer. Otherwise the restriction module comprises the timer. The restriction module is arranged to prevent the secure element to provide usage data and/or to provide restriction information to device. The restriction module can ensure, analyze and monitor the usage of the network by the device and the network. Preferable, the restriction module ensures a connection and/or registration to the network, its supplier and/or its provider. Furthermore, the restriction module starts the timer and ensures a non-registering to the network until the timer has expired. After timer has expired the restriction module enables provision of usage data to the device. The restriction module can be an application running on the secure element, in particular in its operating system. Otherwise, the restriction module can be in hardware.

In one embodiment, the secure element comprises a detection device adapted to detect network availability to the device and/or adapted to detect attempt for usage.

BRIEF DESCRIPTION OF THE DRAWINGS

Other features and advantages of the present invention will become apparent from the following detailed description of the invention made with reference to the accompanying drawings, wherein FIG. 1 shows a flowchart of an example of the present invention.

DETAILED DESCRIPTION OF VARIOUS EMBODIMENTS

FIG. 1 shows an example of a method for using a network 10 according to the invention. In this example, the network 10 could be a telecommunications network 10. To use the network 10 by a device 20 in step S1 the network 10 is active and available to device 20. A secure element 30 is integrated in the device 20. Further, to use the network 10 the device 20 and secure element 30, respectively, has to authenticate to the network 10. In step S2 device 20 recognize the network 10 as available. To use the network 10 by the device 20 in step S3 the device 20 sends a request for usage data to the secure element 30 integrated in the device 20. In step S4 the secure element 30 receives the request for the usage data from the device 20.

In step S5 the secure element 30 processes the request for the usage data from the device 20, in particular the secure element 30 analyses the request and a timer 40. The timer 40 is an application service running on the device 20. The timer 40 measures and counts a delay time, wherein the delay time indicates the time while the secure element 30 is prevented to send usage data to the device 20 and/or while the device 20 is prevented to use the network 10. Furthermore, in step S5 the secure element 30 checks if during the delay time the network 10 is available to device 20 and timer 40 was running continuous. If the timer 40 had not been run continuous or had not been started the secure element 30 re-/starts the timer 40 (step S5.1). Until timer 40 has not expired, in step S6.1 the secure element 30 does not provide the usage data. In particular, the secure element 30 pretends to be busy. Further in Step 6.1, the secure element 30 generates a no-register-command and sends the no-register-command to the device 20. In Step 6.2 the device 20 processes the no-register-command and is set to not registering to network 10 and not to send any data to authenticate. The device 20 is still allowed to take power of the network for its power supply. During this time, any retry from the device to attach to the network is blocked in this fashion.

The method continues from step 6.2 back to step S2, namely detecting network availability by the device 20. If the network 10 is still available, the device prepares (S3) a request for usage data and sends the request to the secure element 30. After receiving (S4) the request for usage data by the secure element, in step S5 it checks the request and the timer 40 (S5.1). When the timer 40 has not expired, the method continues in a loop according the above description, namely S6.1, S6.2 and return to step S2.

When the timer 40 has expired the process continues with step S6.3. That means, check of the timer 40 results that the timer 40 had run and had expired while the network 20 has been continuously available to the device 20. In step S6.4 the secure element 30 provides usage data and sends them to the device 20. In step S7 the device 20 receives the usage data and processes to start using data to perform registering (step 8) and connecting to the network 10. In step S9 the network 10 confers the right to use the network 10 to the device 20 and enables usage of network 10 by the device 20.

After the network 10 is available to the device 20 there is a time delay between the attempt for using the network 10 in step S1 and detection of network availability in step 2, respectively, and final usage of the network 10 by the device 20 at and after step S8 because of the timer 40. The term of the time delay of the timer 40 depends on a time set in timer 40. By applying the invention in multiple devices 20 the multiple devices 20 will not start using the network 10 at the same time. A network-overload because many devices attempt a simultaneous start of usage of the network 10 after the network 10 is available can be reduced. Thus a network-failure can be prevented.

Alternatively, step S6.2 and S2 can be dropped. In the above mentioned loop, the secure element 30 does not send any usage data to device 20 when the timer 40 has not expired. In the alternative process the loop processes directly with step S3. After a predetermined time the device 20 has not received usage data, the device 20 generates a new response and send it to the secure element 30. The loop ends and the method continues with step S4 as above mentioned.

In FIG. 1 the example shows a method according to the invention for usage a telecommunications network. If the network doesn't need registering, e.g. if the network is an electricity network, and in step S5 checking the timer 40 results that the timer 40 has not expired, the method could proceed with an alternative loop comprising the steps:

Sending a no-connection-response or block command from the secure element 30 to the device 20 (analogue to step S6.1);

Device 20 is blocked for usage of network 10; and

After amended step S6.1, returning to step S5;

If the timer 40 has expired, the method proceeds with step S6.3 sending using data from the secure element 30 to the device 20 including a command to connect to and use the network 10. In step S7 the device receives the usage data and uses the network 10 (step S8). Because the network 10 is not requiring authentication step S9 is dropped. The usage data can include parameters to use the network.

As can be seen from the description, the details of steps S2 to S6.2 may vary in the network 10, in particular the general condition and usage of the network 10, e.g. if the network 10 requires registering or only connecting by the device 20.

The invention claimed is:

1. A method for using a network, the method comprising:
receiving, at a secure element of a device, a request for usage data from the device;
sending, by the secure element, the usage data to the device in response to the request, wherein the usage data enables the device to use the network after a reboot process, the device being previously enabled to use the network prior to the reboot process;
applying, by the secure element, a timer to measure a delay time, wherein the device is configured to use the network only after the delay time has expired; and
preventing, by the secure element, the usage of the network by the device until the delay time has expired, wherein the usage data is stored at the secure element prior to the timer being applied and while the timer is measuring the delay time,
wherein the secure element performs the step of starting the timer when the secure element senses an attempt of the device to connect to the network and/or an attempt of the device for registering to the network before the secure element receives the request for usage data from the device, wherein until the delay time has expired and/or after the delay time has expired an external operator configures settings of the secure element, including settings of the timer, including the delay time, and/or settings of behavior, wherein the external operator configures the secure element via an over-the-air-interface, and wherein the secure element performs the step of analyzing a failure on a link between the network and the device.

2. The method according to claim 1, wherein after the delay time has expired the secure element starts a process executed on the device for usage of the network, to register and/or connect to the network.

3. The method according to claim 1, wherein until the delay time has expired the secure element performs the step of blocking the device for usage of the network, for registering to the network and/or for connecting to the network.

4. The method according to claim 1, wherein the secure element logs usage of the network by the device.

5. The method according to claim 4, wherein the secure element starts the timer based on the log, based on a result from a previous usage attempt, including a registration and/or a connecting attempt.

6. The method according to claim 1, wherein the secure element performs the step of applying a random generator to set the delay time.

7. The method according to claim 1, wherein the secure element sets the delay time according to an individual value.

8. The method according to claim 1, wherein until the delay time has expired the secure element sends invalid registering data to prevent usage of the network.

9. The method according to claim 1, wherein after the delay time has expired the secure element initiates a new process for using to network.

10. A secure element of a device that uses a network, the secure element comprising:
   at least one processor;
   a computer readable hardware storage device having stored thereon computer-executable instructions which, when executed by the at least one processor, cause the secure element to perform the following:
   receive a request for usage data from the device, the usage data including data that is used to connect the device to the network;
   send the usage data to the device in response to the request, wherein the usage data enables the device to use the network after a reboot process, the device being previously enabled to use the network prior to the reboot process;
   apply a timer to measure a delay time, wherein the device is configured to use the network only after the delay time has expired; and
   prevent the usage of the network by the device until the delay time has expired, wherein the usage data is stored at the secure element prior to the timer being applied and while the timer is measuring the delay time,
   wherein the secure element performs the step of starting the timer when the secure element senses an attempt of the device to connect to the network and/or an attempt of the device for registering to the network before the secure element receives the request for usage data from the device,
   wherein until the delay time has expired and/or after the delay time has expired an external operator configures settings of the secure element, including settings of the timer, including the delay time, and/or settings of behavior,
   wherein the external operator configures the secure element via an over-the-air-interface, and
   wherein the secure element performs the step of analyzing a failure on a link between the network and the device.

* * * * *